(12) United States Patent
Goncalves

(10) Patent No.: US 11,768,722 B2
(45) Date of Patent: Sep. 26, 2023

(54) METHOD FOR INTER-PROCESS COMMUNICATION BETWEEN AT LEAST TWO PROCESSES

(71) Applicant: BULL SAS, Les Clayes-sous-Bois (FR)

(72) Inventor: Thomas Goncalves, Forges-les-bains (FR)

(73) Assignee: BULL SAS, Les Clayes-sous-Bois (FR)

( * ) Notice: Subject to any disclaimer, the term of this patent is extended or adjusted under 35 U.S.C. 154(b) by 16 days.

(21) Appl. No.: 17/703,423

(22) Filed: Mar. 24, 2022

(65) Prior Publication Data

US 2022/0308948 A1   Sep. 29, 2022

(30) Foreign Application Priority Data

Mar. 24, 2021   (EP) .................................... 21305370

(51) Int. Cl.
*G06F 3/00* (2006.01)
*G06F 9/54* (2006.01)
*G06Q 10/0631* (2023.01)

(52) U.S. Cl.
CPC ....... *G06F 9/546* (2013.01); *G06Q 10/06315* (2013.01)

(58) Field of Classification Search
CPC ...................................... G06F 9/541
USPC ....................................... 719/310
See application file for complete search history.

(56) References Cited

U.S. PATENT DOCUMENTS

| 6,044,406 | A | 3/2000 | Barkey et al. |
| 9,703,602 | B1 * | 7/2017 | Kusters ................... G06F 3/061 |
| 2006/0277126 | A1 | 12/2006 | Rosenbluth et al. |
| 2007/0294435 | A1 * | 12/2007 | Huang ................... H04L 47/35 709/251 |
| 2014/0096141 | A1 * | 4/2014 | Ohmacht ............. G06F 9/4843 718/103 |
| 2019/0089713 | A1 * | 3/2019 | Leftwich ................. H04L 47/50 |

FOREIGN PATENT DOCUMENTS

| CN | 114090199 A | * | 2/2022 |
| EP | 1142215 B1 | | 4/2006 |
| EP | 3637294 A1 | * | 4/2020 | .......... G06F 21/552 |
| WO | WO-2010142987 A1 | * | 12/2010 | ............ G06F 15/82 |

OTHER PUBLICATIONS

Vinton G. Cerf, A Protocol for Packet Network Intercommunication, (Year: 1974).*
European Search Report issued in EP21305370.5, dated Sep. 20, 2021 (12 pages).

* cited by examiner

*Primary Examiner* — Lechi Truong
(74) *Attorney, Agent, or Firm* — ARC IP LAW, PC; Joseph J. Mayo

(57) ABSTRACT

An inter-process communication method for remote processes. The method implements a resource allocation mechanism via a token system that allows a communication operation to be performed only when the target process of the operation has available resources. Each operation costs one token. Tokens are consumed locally and obtained by remote request. This maximizes chances of successful operations and minimizes the bandwidth used to manage these operations.

11 Claims, 3 Drawing Sheets

METHOD FOR INTER-PROCESS COMMUNICATION BETWEEN AT LEAST TWO PROCESSES

This application claims priority to European Patent Application Number 21305370.5, filed 24 Mar. 2021, the specification of which is hereby incorporated herein by reference.

BACKGROUND OF THE INVENTION

Field of the Invention

The object of the invention is a method for inter-process communication between at least two processes.

The technical field of the invention is that of inter-process communication between at least two processes. A process is a coherent set of instructions implemented by a computational unit also called a processor or microprocessor. A coherent set of instructions is, for example, a set of instructions corresponding to a program or an application. The execution of such a program is started, for example, by a command line. At the device which implements this process, a set of resources corresponds to a given process. In this set of resources there is memory which is private, that is accessible only to the process. This memory is assigned to the process by a process scheduler. A process scheduler is also called an operating system.

One or more embodiments of the invention relates to a method which allows, for example, a process A to access data recorded in a memory assigned to a process B. In particular the invention relates to a method implemented by two different devices in order to exchange data from their assigned memories.

The field of the invention is thus also that of multi-node computing infrastructures in which it has to be possible for processes hosted by different nodes to communicate.

Description of the Related Art

In the state of the art, when a process managed by a computational node of a network wants to communicate with another node of the network, for example to perform a read action, a rendezvous protocol is used to ensure that both processes are ready.

This protocol uses the principle of acknowledgement, which consists of a node receiving a first message from a transmitter node, sending a second message to inform the transmitter node of the correct reception of the first message within a given acknowledgement time. Thus, once the transmitter node has received the second message, it is certain that the receiving node is available and the read action can be performed.

If the transmitter node does not receive a message within the given acknowledgement time, the first message is considered not to have been received and a faulty communication alert between the two nodes is generated. The problem with this operation is that it does not take account of what the other nodes in the network are doing simultaneously, and therefore the possible congestion of the network, which can result in the second message arriving after the acknowledgement time has expired without the communication between the two nodes actually being faulty. If many processes are simultaneously exchanging messages on the congested network, multiple alerts will then be generated, which can lead to a network crash.

Without going as far as a network crash, this situation degrades the performance of the computational nodes, which spend too much time waiting for the results of communication actions.

BRIEF SUMMARY OF THE INVENTION

One or more embodiments of the invention offers a solution to the previously mentioned problems, by allowing communications to be regulated by an auto-reservation method which allows a communication action to be performed only when its success is guaranteed, while limiting communications on the network.

One or more embodiments of the invention relates to a method for inter-process communication between at least two processes, each process being hosted by a node on a communication network, a node further hosting a process including a resource manager, characterized in that a resource manager includes at least one resource counter for a target process of a communication, the method according to the invention at least including the following steps of:

Emission by a first process of a first node, to the resource manager of the first node, a business request for a second process of a second node;

Verification, by the manager of the first node, that there is locally at least one token associated with the second process:

If there is a local token then:

The business request is transmitted to the second process;

The number of local tokens associated with the second process is decreased by one by the resource manager of the first node;

The number of remote tokens associated with the second process is increased by one by the resource manager of the second node;

If there is no local token:

Emission by the manager of the first node, to the manager of the second node, a first allocation request for tokens associated with the second process, the first allocation request including a parameter N representing the number of tokens requested;

Reception, by the manager of the first node receiving a response to the first allocation request, the response including a parameter M representing the number of remote tokens associated with the second process prior to receiving the first allocation request;

Evaluating the value of M−N:

If it is greater than or equal to a predetermined threshold then the manager of the first node increases the number of local tokens associated with the second process by N and returns to the verification step;

If it is less than the predetermined threshold then the value of M is evaluated:

If it is greater than the predetermined threshold then the manager of the first node transmits a second allocation request with a parameter having a value of M−N, increases the number of local tokens by M, returns to the verification step;

If it is less than or equal to the predetermined threshold then, the manager of the first node:

Emits, to the manager of the second node, a third allocation request for the second process with a parameter having a value of –N, Emits, to the manager of the second node, a notification that it is waiting for N tokens for the second process;

Places itself in a state of waiting for a response to the notification;

When it receives a response to the notification, the notification includes a parameter N' representing the number of tokens allocated, the manager of the first node increases the number of local tokens associated with the second process by N' and returns to the verification step.

Further to the characteristics just discussed in the preceding paragraph, the method according to at least one embodiment of the invention may have one or more additional characteristics among the following, considered individually or in any technically possible combinations:

The update of the numbers of tokens is carried out only if the business request is successfully processed;

The predetermined threshold is zero;

The value of the parameter N of the first allocation request is a node parameter;

A business request is a read request;

A business request is a write request;

Upon receiving an allocation request emitted by the manager of the first node, the manager of the second node decreases the number of local tokens by the value of the parameter included in the allocation request for the process designated by the request;

The resource manager of the second node implements the following steps of:

Waiting for a notification:
  If no notification is received then continue waiting;
  If a notification is received then for the process designated by the notification the following actions are performed:
    Reading a number m of tokens, m being the number of tokens available for the process designated as a remote process;
    Evaluating (2030) m:
    If m is less than or equal to the predetermined threshold then the notification processing is repeated;
    If m is strictly greater than the predetermined threshold then, reducing the number of tokens associated with the process designated by the notification by N, N being the number of tokens requested by the notification,
    Evaluating m–N:
    If m–N is strictly greater than the predetermined threshold then the second resource manager:
      Emits a response to the notification with the value N as a parameter;
    If m–N is less than or equal to the predetermined threshold then the second resource manager:
      Emits a response to the notification with the value N'=m as a parameter;
      Increases the number of tokens associated with the process designated as a remote process by N–m.

A timeout is carried out before repeating the processing of the notification.

One or more embodiments of the invention relates to a computer program for performing inter-process communications able to, preferably configured to, implement an inter-process communication method according to a possible one of the preceding characteristics.

At least one embodiment of the invention relates to a recording medium on which a computer program is recorded for performing inter-process communications according to the preceding paragraph.

The invention and its various applications will be better understood upon reading the following description and examining the accompanying figures.

BRIEF DESCRIPTION OF THE DRAWINGS

The figures are set forth as indicating and in no way limiting purposes for the invention.

DETAILED DESCRIPTION OF THE INVENTION

The figures are set forth as indicating and in no way limiting purposes for one or more embodiments of the invention.

Figure 1:
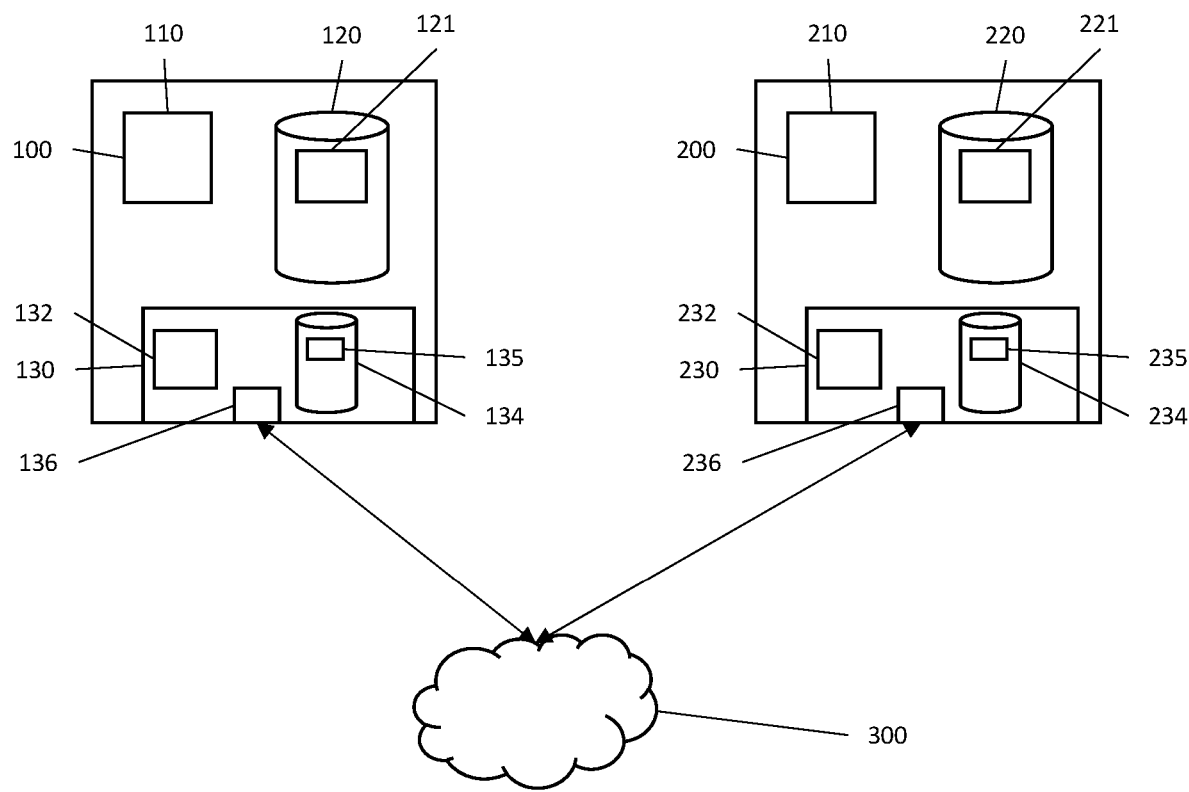
FIG. 1 shows a schematic representation of a device implementing the method according to one or more embodiments of the invention.

FIG. 1 shows a first node 100. FIG. 1 shows that the first node 100 includes:

A microprocessor 110 which is also referred to as computational means;

Data storage means 120. This is a schematic representation that includes both transient and non-transient memory. The transient memory is, for example, RAM. The non-transient memory is, for example, a hard drive, an SSD drive or other. These storage means are local or remote depending on the hardware infrastructures on which the invention is implemented.

A resource management card 130. The resource management card 130 itself includes a microprocessor 132, storage means 134 of a type already described and a communication interface 136. The communication interface is, for example, an "Ethernet" interface, a "Fiber Channel" interface, an "InfiniBand" interface or an interface according to another standard used for communications in computational farms.

FIG. 1 shows that the storage means of the first node include a process zone 121. This zone includes instruction codes and working memory corresponding to a first process implemented by the microprocessor 110 of the first node.

In this description, according to one or more embodiments of the invention, when an action is assigned to a device, this action is carried out by computational means of said device implementing instruction codes, also known as executable codes, recorded in a storage memory of said device. Similarly, when a device communicates, this means that it transmits and/or receives messages via a communication interface. These messages are produced and/or processed by computational means of said device. Conventionally, such a message includes at least a emitter identifier and a recipient identifier.

An action can also be assigned to an application, a process or a software. Application, process, or software means any expression, code, or notation, of a set of instructions intended to cause data processing to perform a particular function directly or indirectly (for example, after a conversion action to another code). Examples of program code may include, but are not limited to, a subprogram, function, executable application, source code, object code, library, and/or any other sequence of instructions designed for execution on a computer system.

FIG. 1 shows that the storage means of the resource management card 130 of the first node include a resource manager zone 135. The resource manager zone 135 includes instruction codes corresponding to the implementation of the method according to the invention and counters which will be described later.

When the first process emits a message, this message is taken over by the resource manager 135 of the resource management card of the first node. In an alternative hardware architecture, the resource manager 135 is implemented by the microprocessor of the first node. In this alternative architecture, the resource management card 130 of the first node is akin to a network interface.

FIG. 1 shows a second node 200. The second node is structurally identical to the first node. FIG. 1 shows that the second node includes:
  A microprocessor 210;
  Data storage means 220;
  A resource management card 230. The resource management card 230 itself includes a microprocessor 232, storage means 234, and a communication interface 236.

FIG. 1 shows that the storage means of the first node include a process zone 221. This zone includes instruction codes and working memory corresponding to a second process implemented by the microprocessor 210 of the second node.

FIG. 1 shows that the storage means of the resource management card 230 of the second node include a resource manager zone 235. The resource manager zone 235 includes instruction codes corresponding to the implementation of the method according to the invention and counters which will be described later.

FIG. 1 shows an interconnection network 300. FIG. 1 shows that the first node and the second node are connected to the network 300.

The first node, the second node, and the interconnection network 300 belong to a computer not represented. A computer includes a large number of nodes.

Typically this number is several thousands. In practice, the invention applies as soon as there are two nodes and has no upper limit.

Figure 2:
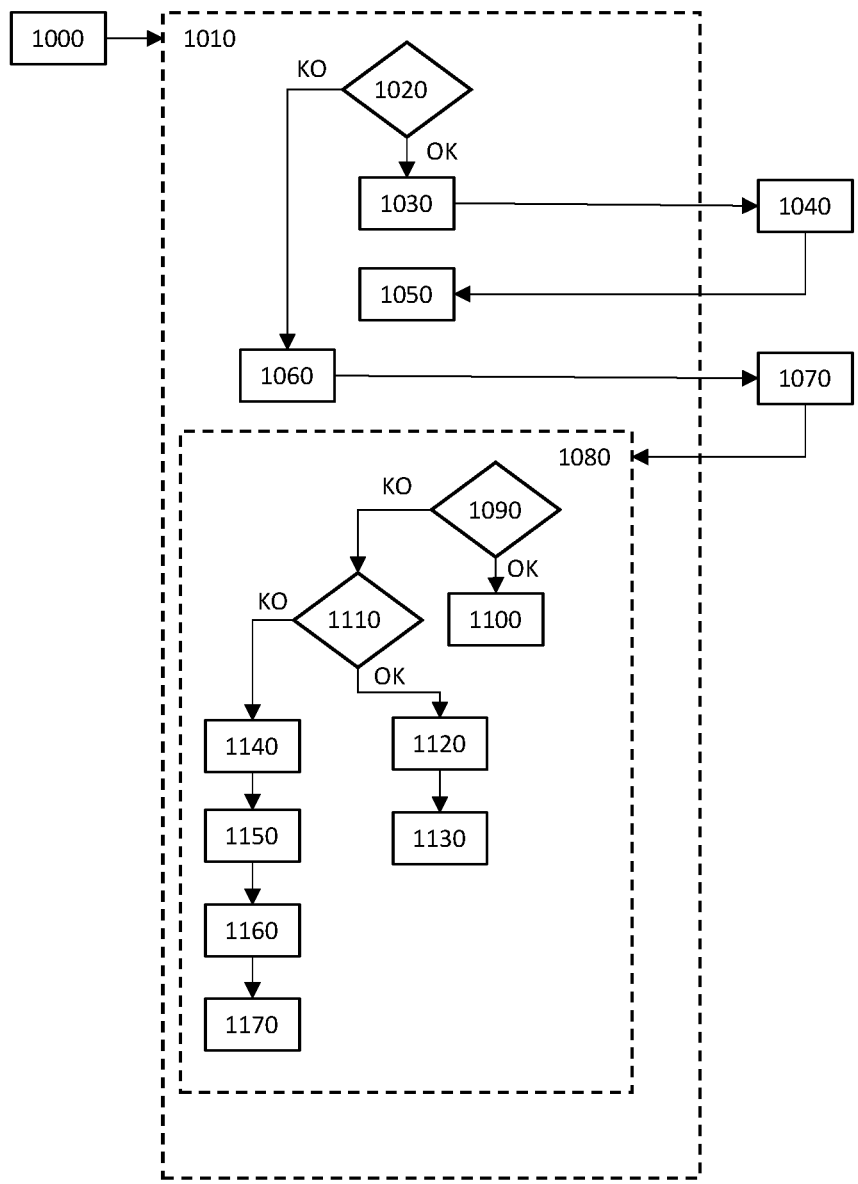
FIG. 2 An illustration of steps of the method according to the invention.

FIG. 2 shows a step 1000 of the first process emitting, to the resource manager of the first node, a business request for the second process.

When it is said that a process transmits, to a resource manager, a request for a second process on a second node this can be implemented in at least two ways:
  The request is actually emitted to the resource manager;
  The request is intercepted, transparently for the emitter process, by the resource manager.

A business request is, for example, a request to read a memory zone belonging to another process, or a request to write a memory zone belonging to another process. The read notion can be extended to the invocation of a function implemented by another process, in which case it is a question of requesting this other process to perform a processing and to return the result of this processing in response.

In the example described, it is considered that the business request is a read request. In this example, the business request includes at least one identifier of the remote process.

FIG. 2 shows a step 1010 of the resource manager receiving and verifying a business request. In step 1010 the resource manager of the first node performs a verification 1020 in which it verifies whether there is at least one token associated with the recipient process of the read request. Here the recipient process is the second process.

The resource manager zone 135 of the resource management card 130 of the first node includes at least a first token counter. Generally speaking, in this description a token counter is the association of a process identifier and a number. For the sake of brevity, it is referred to as a counter. The process identifier allows the process and the node which executes it to be identified. It is therefore possible to know whether the process is local to the node or remote.

The number corresponds to the number of requests that can still be processed by the process identified by the identifier. Each token corresponds to a request. A token is added by increasing the counter by one. A token is removed by decreasing the counter by one.

If there is a token associated with the second process, that is if the number of tokens is strictly greater than zero, then the resource manager proceeds to a step 1030 of emission of the request to the second process.

In a subsequent step the business request is received by the resource manager of the second node. The second resource manager performs the following actions:
  Transmission of the request to the second process;
  Receiving the response from the second process to the request;
  Increasing 1040 by one (+1) a counter associated with the second process at the second resource manager;
  Emission of the response to the business request to the resource manager of the first node.

In a subsequent step, the resource manager of the first node receives the response to the business request. The resource manager of the first node then performs the following actions:
  Transmission of the response to the first process;
  Decreasing 1050 by one (−1) the counter associated with the second process at the resource manager of the first node.

It is noted that it is possible for the resource managers to have access to the memory allocated to the processes. In this case the resource manager does not need to communicate with the process to perform a read action, it can do it itself and thus respond to the business request.

It is also noted that in an alternative of the invention, the increase by one (+1) of the counter associated with the second process at the second resource manager is controlled by the resource manager of the first node. In this alternative, the resource manager of the first node emits a request to the resource manager of the second node to increase by one the counter associated with the second process at the second manager at the same time as it decreases by one the counter associated with the second process at the resource manager of the first node. Thus, the order of execution of steps 1040 and 1050 depends on the chosen implementation mode and on the availability of the resource managers. Indeed, they perform their actions in parallel.

If there is no local token, then the resource manager of the first node proceeds to a step 1060 of emission, to the resource manager of the second node, a first allocation request for tokens associated with the second process. This first allocation request includes at least one parameter N, where N is the number of tokens desired to be allocated.

N is a parameter of the method according to the invention which is fixed at the time of the start of the computer. In a conventional implementation, N is in the order of a few units or in the range [2, 10].

FIG. 2 shows a step 1070 of receiving and processing, by the resource manager of the second node, an allocation request for tokens for a process. The resource manager of the second node responds to this request by returning the value of a read of the counter associated with the process designated by the allocation request at the second node. Once this read is taken, the resource manager of the second node decreases said counter by the number of tokens N requested by the allocation request.

FIG. 2 shows a step 1080 of receiving, by the resource manager of the first node, a response to the first allocation request. The response includes a parameter M representing the number of remote tokens associated with the second process prior to receiving the allocation request. In other words, M is the value of the counter associated with the second process at the resource manager of the second node at the time of receiving the first allocation request.

The resource manager of the first node then proceeds to a step of evaluating M−N, that is the difference between the number of available tokens and the number of tokens requested. In particular, it is tested if this difference is greater than or equal to a predetermined threshold. In our example this threshold is zero (0).

If the difference is greater than or equal to the threshold, then the resource manager of the first node proceeds to a step 1100 of increasing by N the number of tokens associated with the second process at the first node. It then becomes possible again for processes hosted by the first node to transmit requests to the second process, and the resource manager of the first node returns to the beginning of the verification step 1010.

If the difference is less than the threshold, then in a step 1110 of evaluating M, the resource manager of the first node evaluates the value of M.

If M is greater than the predetermined value, zero in our example, then the resource manager of the first node performs the following actions:

Emitting (1120) a second allocation request, for the second process to the resource manager of the second node, with a parameter being M−N. The resource manager of the second node then increases the counter of the second process by N−M, a counter that was decremented by N in step 1070;

Increasing (1130) the number of tokens associated with the second process at the resource manager of the first node by M;

Returning to the beginning of the verification step 1010.

If M is less than or equal to the predetermined value, zero in our example, then the resource manager of the first node performs the following actions:

Emitting 1140, to the resource manager of the second node, a third allocation request for the second process, with a parameter having a value of −N. The resource manager of the second node then increases the counter of the second process by N, a counter that was decremented by N in step 1070;

Emitting 1150, to the resource manager of the second node, a notification designating the second process with a parameter having a value of N;

Placing 1160 itself in a state of waiting for a response to the notification;

Receiving 1170 a response to the notification, this response including a parameter N'. It then increases the number of tokens associated with the second process at the manager of the first node by N' and then returns to the beginning of the verification step 1010. N' may be equal to or different from N.

The fact that the first resource manager goes into a wait state does not mean that it is blocked. It continues to process requests from other processes and other node managers.

The term notification has been used for clarity to refer to a request that is not an allocation request although it has the same structure, namely it designates a process and includes an expected number of tokens.

Figure 3:
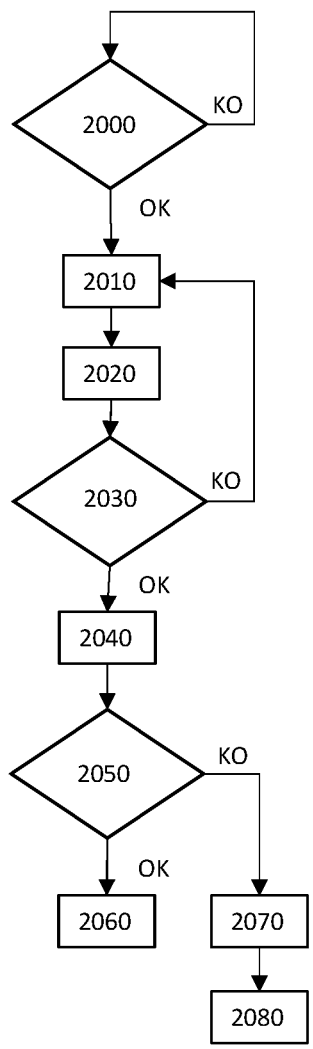
FIG. 3 An illustration of steps implemented by a third party device to cooperate with the method according to one or more embodiments of the invention.

FIG. 3 shows a step 2000, implemented by the resource manager of the second node in which it is waiting for a notification such as the one previously described. If no notification is received then the resource manager of the second node continues to perform its tasks, one of which is waiting for notifications. If a notification is received then it proceeds to a step 2010 of reading the parameters of the notification. In the example the resource manager of the second node receives a notification designating the second process and requesting N tokens. Once it has read these parameters, it proceeds to the subsequent step 2020.

In step 2020 the resource manager of the second node reads the value of the counter associated, at the resource manager of the second node, with the process designated in the notification. This value is referred to here as m. The resource manager of the second node then proceeds to a step 2030 of evaluating m.

In the step of evaluating m, if m is less than or equal to the predetermined threshold, zero in our example, then the resource manager of the second node returns to the beginning of the notification processing. Otherwise, the resource manager of the second node proceeds to a step 2040 of reducing the counter corresponding to the process designated by the notification. This counter is decreased by N and then the resource manager of the second node proceeds to a step 2050 of evaluating m−N.

If m−N is strictly greater than the predetermined threshold, in our example zero, then the resource manager of the second node performs the following actions:

Emitting (2060) a response to the notification with a parameter having a value of N.

If m−N is less than or equal to the predetermined threshold, in our example zero, then the resource manager of the second node performs the following actions:

Emitting (2070) a response to the notification with a parameter having a value of m;

Increasing (2080) the number of tokens associated with the process designated by the notification at the resource manager of the second node by N−m.

It is noticed that the steps of processing the notification by the resource manager of the second node are based on those implemented by the resource manager of the first node for managing the business request. In practice, it could be done otherwise. The principle is to allocate the maximum number of resources possible, this maximum being between 1 and N, N being the number of tokens requested by the notification.

The method according to one or more embodiments of the invention allows operations to be authorized only when the second process has available resources and limits the number of operations per process in order to limit the congestion of the network.

Using a notification when no resource is available rather than repeating the reservation steps as long as the process has no available resources limits the number of messages exchanged in the network. Since the notification has no acknowledgement mechanism, no alert is generated due to network congestion, which limits crashes of the computer.

The invention claimed is:

1. A method for inter-process communication between at least two processes, each process of said at least two processes being hosted by a node on a communication network, the node further hosting a further process including a resource manager, wherein the resource manager includes at least one resource counter for a target process of a communication, the method comprising:
    emission by a first process of a first node, to a resource manager of the first node, a business request for a second process of a second node;
    verification by the resource manager of the first node, that there is locally at least one token associated with the second process:
        if there is a local token then:
            the business request is transmitted to the second process;
            a number of local tokens associated with the second process is decreased by one by the resource manager of the first node;
            a number of remote tokens associated with the second process is increased by one by a resource manager of the second node;
        if there is no local token:
            emission by the resource manager of the first node, to the resource manager of the second node, a first allocation request for tokens associated with the second process, the first allocation request including a parameter N representing a number of tokens requested;
            reception by the resource manager of the first node a response to the first allocation request, the response including a parameter M representing a number of remote tokens associated with the second process prior to receiving the first allocation request;
            evaluating a value of M−N:
                if the value of M−N is greater than or equal to a predetermined threshold then the resource manager of the first node increases the number of local tokens associated with the second process by N and returns to the verification;
                if the value of M−N is less than the predetermined threshold then the value of M is evaluated:
                    if the value of M is greater than the predetermined threshold then the resource manager of the first node transmits a second allocation request with a parameter having a value of M−N, increases the number of local tokens by M, returns to the verification;
                    if the value of M is less than or equal to the predetermined threshold then, the resource manager of the first node:
                        emits, to the resource manager of the second node, a third allocation request for the second process with a parameter having a value of −N, emits, to the resource manager of the second node, a notification that it is waiting for N tokens for the second process;
places itself in a state of waiting for a response to the notification;
when it receives a response to the notification, the notification includes a parameter N' representing the number of tokens allocated, the resource manager of the first node increases the number of local tokens associated with the second process by N' and returns to the verification.

2. The method for inter-process communication according to claim 1, wherein an update of the number of local tokens is carried out only if the business request is successfully processed.

3. The method for inter-process communication according to claim 1, wherein the predetermined threshold is zero.

4. The method for inter-process communication method according to claim 1, wherein the value of the parameter N of the first allocation request is a parameter of the node.

5. The method for inter-process communication method according to claim 1, wherein the business request is a read request.

6. The method for inter-process communication according to claim 1, wherein the business request is a write request.

7. The method for inter-process communication according to claim 1, wherein upon receiving the first allocation request emitted by the resource manager of the first node, the resource manager of the second node decreases the number of local tokens by the value of the parameter included in the first allocation request for the first process designated by the first allocation request.

8. The method for inter-process communication according to claim 1, wherein the resource manager of the second node waits for notification, wherein
    if no notification is received then the resource manager of the second node continues waiting;
    if a notification is received then for the second process designated by the notification, the resource manager of the second node
        reads a number m of tokens, m being the number of tokens available for the second process designated as a remote process;
        evaluates m, wherein
            if m is less than or equal to the predetermined threshold then processing of the notification is repeated;
            if m is strictly greater than the predetermined threshold then, reducing the number of tokens associated with the second process designated by the notification by a value N, N being the number of tokens requested by the notification,
        evaluates m−N, wherein
            if m−N is strictly greater than the predetermined threshold then the resource manager of the second node
                emits a response to the notification with the value N as a parameter;
            if m−N is less than or equal to the predetermined threshold then the resource manager of the second node
                emits a response to the notification with value N'=m as a parameter;
                increases the number of tokens associated with the second process designated as a remote process by N−m.

9. The method for inter-process communication according to claim 8, further comprising carrying out a timeout before repeating processing of the notification.

10. A non-transitory computer program for performing inter-process communications configured to implement an inter-process communication method between at least two processes, each process of said at least two processes being hosted by a node on a communication network, the node further hosting a further process including a resource manager, wherein the resource manager includes at least one resource counter for a target process of a communication, the inter-process communication method comprising:

emission by a first process of a first node, to a resource manager of the first node, a business request for a second process of a second node;

verification by the resource manager of the first node, that there is locally at least one token associated with the second process:

if there is a local token then:
      the business request is transmitted to the second process;
      a number of local tokens associated with the second process is decreased by one by the resource manager of the first node;
      a number of remote tokens associated with the second process is increased by one by a resource manager of the second node;
    if there is no local token:
      emission by the resource manager of the first node, to the resource manager of the second node, a first allocation request for tokens associated with the second process, the first allocation request including a parameter N representing a number of tokens requested;
      reception by the resource manager of the first node a response to the first allocation request, the response including a parameter M representing a number of remote tokens associated with the second process prior to receiving the first allocation request;
      evaluating a value of M−N:
        if the value of M−N is greater than or equal to a predetermined threshold then the resource manager of the first node increases the number of local tokens associated with the second process by N and returns to the verification;
        if the value of M−N is less than the predetermined threshold then the value of M is evaluated:
          if the value of M is greater than the predetermined threshold then the resource manager of the first node transmits a second allocation request with a parameter having a value of M −N, increases the number of local tokens by M, returns to the verification;
          if the value of M is less than or equal to the predetermined threshold then, the resource manager of the first node:
            emits, to the resource manager of the second node, a third allocation request for the second process with a parameter having a value of −N,
            emits, to the resource manager of the second node, a notification that it is waiting for N tokens for the second process;
            places itself in a state of waiting for a response to the notification;
            when it receives a response to the notification, the notification includes a parameter N' representing the number of tokens allocated, the resource manager of the first node increases the number of local tokens associated with the second process by N' and returns to the verification.

11. A non-transitory recording medium on which a non-transitory computer program is recorded for performing inter-process communications configured to implement an inter-process communication method between at least two processes, each process of said at least two processes being hosted by a node on a communication network, the node further hosting a further process including a resource manager, wherein the resource manager includes at least one resource counter for a target process of a communication, the inter-process communication method comprising:

emission by a first process of a first node, to a resource manager of the first node, a business request for a second process of a second node;

verification by the resource manager of the first node, that there is locally at least one token associated with the second process:

if there is a local token then:
      the business request is transmitted to the second process;
      a number of local tokens associated with the second process is decreased by one by the resource manager of the first node;
      a number of remote tokens associated with the second process is increased by one by a resource manager of the second node;
    if there is no local token:
      emission by the resource manager of the first node, to the resource manager of the second node, a first allocation request for tokens associated with the second process, the first allocation request including a parameter N representing a number of tokens requested;
      reception by the resource manager of the first node a response to the first allocation request, the response including a parameter M representing a number of remote tokens associated with the second process prior to receiving the first allocation request;
      evaluating a value of M−N:
        if the value of M−N is greater than or equal to a predetermined threshold then the resource manager of the first node increases the number of local tokens associated with the second process by N and returns to the verification;
        if the value of M−N is less than the predetermined threshold then the value of M is evaluated:
          if the value of M is greater than the predetermined threshold then the resource manager of the first node transmits a second allocation request with a parameter having a value of M −N, increases the number of local tokens by M, returns to the verification;
          if the value of M is less than or equal to the predetermined threshold then, the resource manager of the first node:
            emits, to the resource manager of the second node, a third allocation request for the second process with a parameter having a value of −N,
            emits, to the resource manager of the second node, a notification that it is waiting for N tokens for the second process;
            places itself in a state of waiting for a response to the notification;

when it receives a response to the notification, the notification includes a parameter N' representing the number of tokens allocated, the resource manager of the first node increases the number of local tokens associated with the second process by N' and returns to the verification.

\* \* \* \* \*